(12) United States Patent
Tomizawa

(10) Patent No.: US 6,678,471 B2
(45) Date of Patent: Jan. 13, 2004

(54) CAMERA AND WRAPPING SHEET THEREFOR

(75) Inventor: Hideo Tomizawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/520,801

(22) Filed: Mar. 8, 2000

(65) Prior Publication Data

US 2002/0197069 A1 Dec. 26, 2002

(30) Foreign Application Priority Data

Mar. 12, 1999 (JP) .......................... 11-066822
May 7, 1999 (JP) .......................... 11-126848

(51) Int. Cl.[7] ............................................. G03B 17/02
(52) U.S. Cl. ........................................ 396/6; 396/535
(58) Field of Search ...................... 396/6, 535, 540, 396/541; 206/316.1, 316.2, 769, 770

(56) References Cited

U.S. PATENT DOCUMENTS

| | | | | |
|---|---|---|---|---|
| 4,763,930 A | * | 8/1988 | Matney | 283/81 |
| 4,797,697 A | * | 1/1989 | Heuer et al. | 396/535 |
| 5,495,944 A | * | 3/1996 | Lermer | 206/459.01 |
| 5,591,290 A | * | 1/1997 | Walter et al. | 156/152 |
| 5,634,164 A | | 5/1997 | Isozaki | |
| 5,721,962 A | * | 2/1998 | Fant | 396/6 |
| 5,784,652 A | * | 7/1998 | Schroder et al. | 396/6 |
| 5,933,658 A | * | 8/1999 | Ichino et al. | 396/6 |
| 6,153,042 A | * | 11/2000 | Tominaga | 156/344 |
| 6,330,396 B1 | * | 12/2001 | Boyd et al. | 396/535 |

FOREIGN PATENT DOCUMENTS

| | | | | |
|---|---|---|---|---|
| JP | 53235118 | | 12/1993 | |
| JP | 9-54397 | | 2/1997 | |
| JP | 9054397 | | 2/1997 | |
| JP | 09054397 | * | 2/1997 | G03C/3/00 |

* cited by examiner

Primary Examiner—Russell Adams
Assistant Examiner—Arthur A Smith
(74) Attorney, Agent, or Firm—Young & Thompson

(57) ABSTRACT

A wrapping sheet made of a transparent sheet material such as polypropylene is provided with an opaque area where directions and the like are partially printed. A back side of the wrapping sheet is coated with an adhesive agent, which forms an adhesive agent layer. A dot printing (so-called an adhesion reduction) is applied to an area of the wrapping sheet covering an uneven part of a camera body at a printing rate of 20–100% to reduce an adhesion of the adhesive agent. The adhesion at edges of the wrapping sheet is higher than that of the area covering the uneven part in order to prevent the wrapping sheet from coming off.

63 Claims, 13 Drawing Sheets

F I G. 3
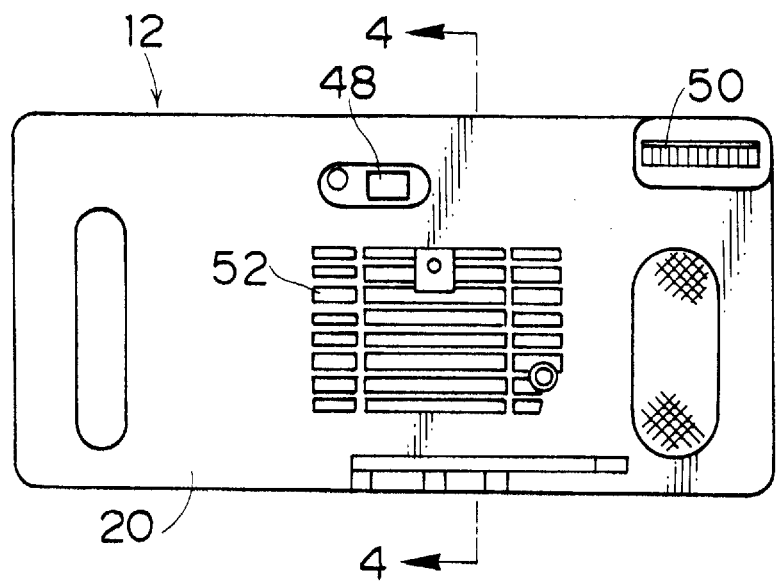
F I G. 4
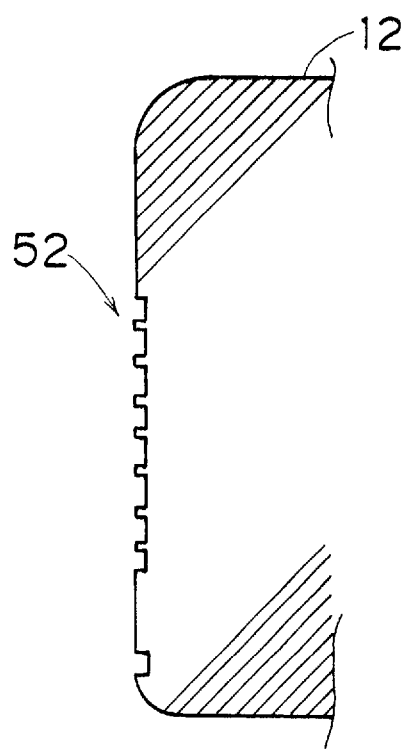

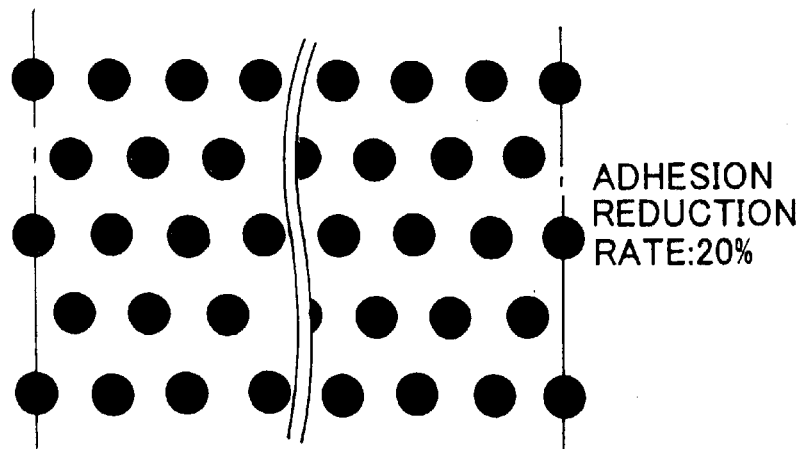
FIG. 8 (A) ADHESION REDUCTION RATE:20%
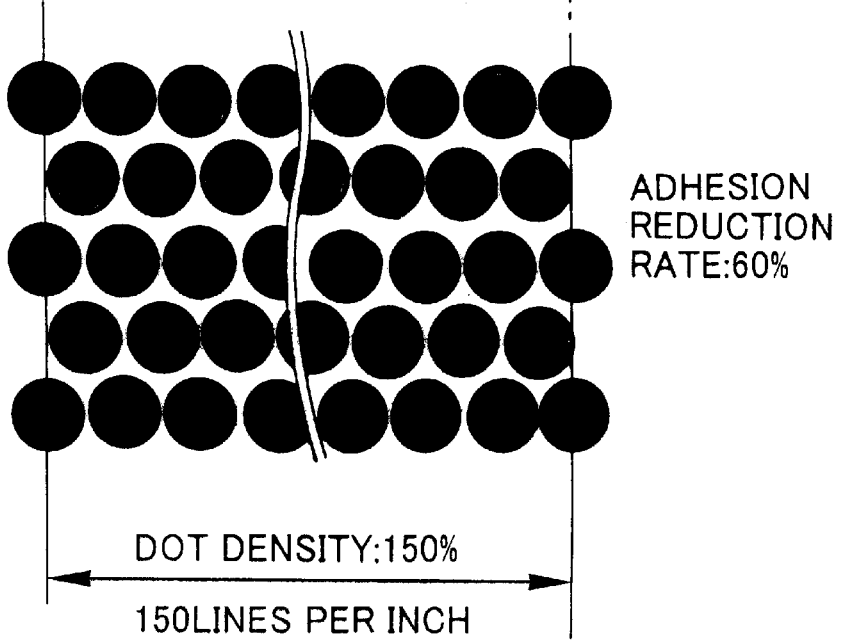
FIG. 8 (B) ADHESION REDUCTION RATE:60%
DOT DENSITY:150%
150 LINES PER INCH F I G. 1 4
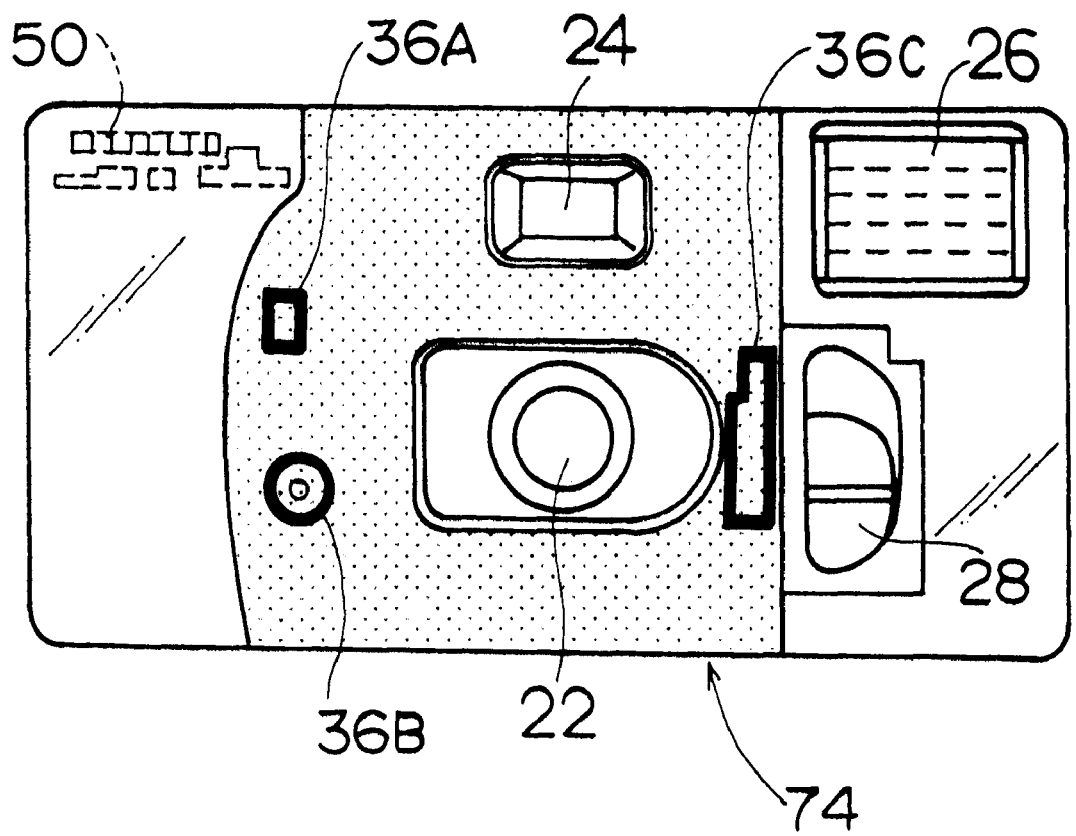

F I G. 17

| | | EXAMPLE 1 | EXAMPLE 2 | EXAMPLE 3 | EXAMPLE 4 |
|---|---|---|---|---|---|
| LABEL | BASE MATERIAL | OPP60μ | PET25μ | PVC50μ | PS40μ |
| | ADHESIVE AGENT | ACRYLIC ADHESIVE AGENT WITH STRONG ADHESION COATING RATE 20g/m² | ACRYLIC ADHESIVE AGENT WITH STRONG ADHESION COATING RATE 20g/m² | ACRYLIC REMOVABLE ADHESIVE AGENT COATING RATE 20g/m² | ACRYLIC REMOVABLE ADHESIVE AGENT COATING RATE 20g/m² |
| ADHESION REDUC- TION | DOT PRINTING | END FACE 30% ALL-OVER SURFACE 80% NUMBER OF LINES 60 | END FACE 20% ALL-OVER SURFACE 60% NUMBER OF LINES 150 | END FACE 10% ALL-OVER SURFACE 90% NUMBER OF LINES 85 | END FACE 0% ALL-OVER SURFACE 70% NUMBER OF LINES 100 |
| | INK | UV BEST CURE 161 PRODUCED BY TOKA | ← | ← | ← |

CAMERA AND WRAPPING SHEET THEREFOR

BACKGROUND OF THE INVENTION

1. Field of the Invention

The present invention relates generally to a camera and a wrapping sheet therefor. More particularly, the present invention relates to a single-use camera and a wrapping sheet suitable for being attached to the surface of the single-use camera.

2. Description of Related Art

The single-use camera has a simple photographing mechanism (e.g., a lens and a shutter), and comprises a camera body having a built-in film cartridge and a sheet wrapping the camera body. For example, Japanese Patent Provisional Publication No. 9-54397 discloses a method in which a band-shaped wrapping sheet, which is made of paper of fine quality, polyethylene terephthalate (PET), etc., is wound on a central part of the camera body and is fixed to the camera body with an adhesive. The wrapping sheet fixed to the camera body is removed from the camera body in a recycling step of the single-use camera. To simplify the removal of the wrapping sheet, Japanese Patent Provisional Publication No. 9-54397 discloses an adhesion reducing process (e.g., an embossing process and the formation of an ink layer) for an adhesive agent layer of the wrapping sheet to thereby achieve both the fixability and the removability.

A label (the wrapping sheet) is attached to the single-use camera in such a manner that it is wound around the whole circumference of the camera body. A designing print is applied on the surface of the label covering the front of the camera. The directions and the like are printed on the surface of the label covering the back of the camera.

The conventional camera body and the wrapping label are made of materials that never transmit light, in order to shield the light. The camera thus has a gloomy impression. Moreover, there are only a small number of design variations for a simplified camera such as the single-use camera.

Therefore, the applicant of the present invention has developed an idea of using a transparent label to dress the camera. The applicant of the present invention aims at solving such a problem in that the use of the transparent label for wrapping the camera causes an uneven part of the camera body to be seen well through the label. This deteriorates the appearance of the camera, and makes it hard to read the directions and the like.

The transparent label is mainly attached to a flat surface, but there is the necessity of attaching the transparent label to the uneven part of the camera body such as a part where holes are partially formed in the case of the single-use camera. In this case, the uneven part of the body can be seen well through the label to deteriorate the appearance of the camera.

To address these problems, a so-called "all-over uniform printing" may be applied on the label with a large amount of ink to conceal the uneven part of the body, and the directions are printed over the all-over uniform printing on the label. However, there is a limitation to the amount of ink, and it is impossible to achieve a satisfactory result since the uneven part cannot be completely concealed. Moreover, if a large amount of ink is used, the ink would become an impurity factor to deteriorate the quality of regenerated resin in the recycling step.

SUMMARY OF THE INVENTION

It is therefore an object of the present invention to provide a camera wrapping sheet that erases a gloomy and stiff image of a camera, and increases design variations. It is another object of the present invention to provide a wrapping sheet, which is entirely transparent or partially includes an opaque area where directions are printed, while maintaining a flat and good appearance regardless of unevenness of the surface of the camera and making it easier to read letters on the wrapping sheet, and a camera to which the wrapping sheet is attached.

The above object can be accomplished by providing a camera wrapping sheet attached to a surface of a camera body, wherein: the camera wrapping sheet is made of a transparent resin; and an adhesive is provided at one side of the camera wrapping sheet to be attached to the surface of the camera body.

In the present description, the word "transparent" is used in a broad sense including "semitransparent", "translucent" and "transparent, semitransparent or translucent, and colored" as well as "transparent, semitransparent or translucent, and colorless". In short, the word "transparent" means that it is possible to see through an object much or less.

According to the present invention, the transparent label made of a light-transmissible resin is attached to the surface of the camera body, and this makes a boundary between the camera body and the label inconspicuous and achieves a good appearance. In particular, the camera body is transparent and the transparent label of the present invention is attached on the camera body, and this makes the camera brighter.

Since the "all-over uniform printing" is not applied to the transparent area of the transparent label, and this decreases the amount of impurities generated from the ink and prevents the deterioration of regenerated resin.

In one preferred mode of the present invention, an adhesive agent is coated on a side to be attached to the surface of the camera body.

In another preferred mode of the present invention, a camera wrapping sheet attached to a surface of a camera body, is characterized in that: the camera wrapping sheet has a transparent area and an opaque area; an adhesive agent is coated on one side of the camera wrapping sheet to be attached to the surface of the camera body to thereby form an adhesive agent layer; and an adhesion reduction process is applied to a part of an adhesive surface of the adhesive agent layer to reduce an adhesion of the adhesive agent, the part covering an uneven part of the camera body.

On the attachment surface of the wrapping sheet, the adhesion of the area to which the adhesion reduction process is applied is lower than that of the other area for which the adhesion reduction process is unexecuted. The adhesion reduction process is applied for the adhesive surface of the area of the wrapping sheet covering the uneven part of the camera body. This reduces the adhesion of the area covering the uneven part, and the uneven part of the camera body can be seen less through the wrapping sheet. This improves the appearance of the camera, and makes it easier to read the directions and the like.

Instead of the wrapping sheet having the transparent area and the opaque area, it is possible to use a wrapping sheet that is entirely composed of a transparent body. In one preferred form of the adhesion reducing process, a transparent ink is applied to the adhesive surface by dot printing.

The above object can also be accomplished by providing a camera in which a wrapping sheet is attached to a surface of a camera body, wherein: the wrapping sheet has a transparent area and an opaque area; an adhesive agent layer is formed on one side of the wrapping sheet to be attached to the surface of the camera body; an adhesion reduction process is applied to an area of an adhesive surface of the adhesive agent layer to reduce an adhesion of the adhesive agent layer, the area covering an uneven part of the camera body; and the wrapping sheet is fixed to the camera body by the adhesion reduced by the adhesion reduction process.

It is possible to use a wrapping sheet, which is entirely composed of a transparent body, instead of the wrapping sheet having the transparent area and the opaque area. More particularly, the present invention is suitable for a single-use camera, into which a photographic film is loaded in advance and a taking lens and a shutter mechanism are incorporated.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 3 is a back view showing a camera body of the single-use camera in FIG. 1;

FIG. 4 is a sectional view of a principal part taken along a line 4—4 in FIG. 3;

FIGS. 8(A) and 8(B) are explanation drawings showing the concept of a printing rate (an adhesion reduction rate) in dot printing;

FIG. 14 is a front view showing a comparative example of a single-use camera in the case where an adhesion reduction process is not applied to the adhesive surface of the wrapping sheet;

FIG. 17 is a chart showing the first through fourth examples of the wrapping sheet according to the present invention.

DETAILED DESCRIPTION OF THE PREFERRED EMBODIMENT

This invention will be described in further detail by way of example with reference to the accompanying drawings.

Figure 1:
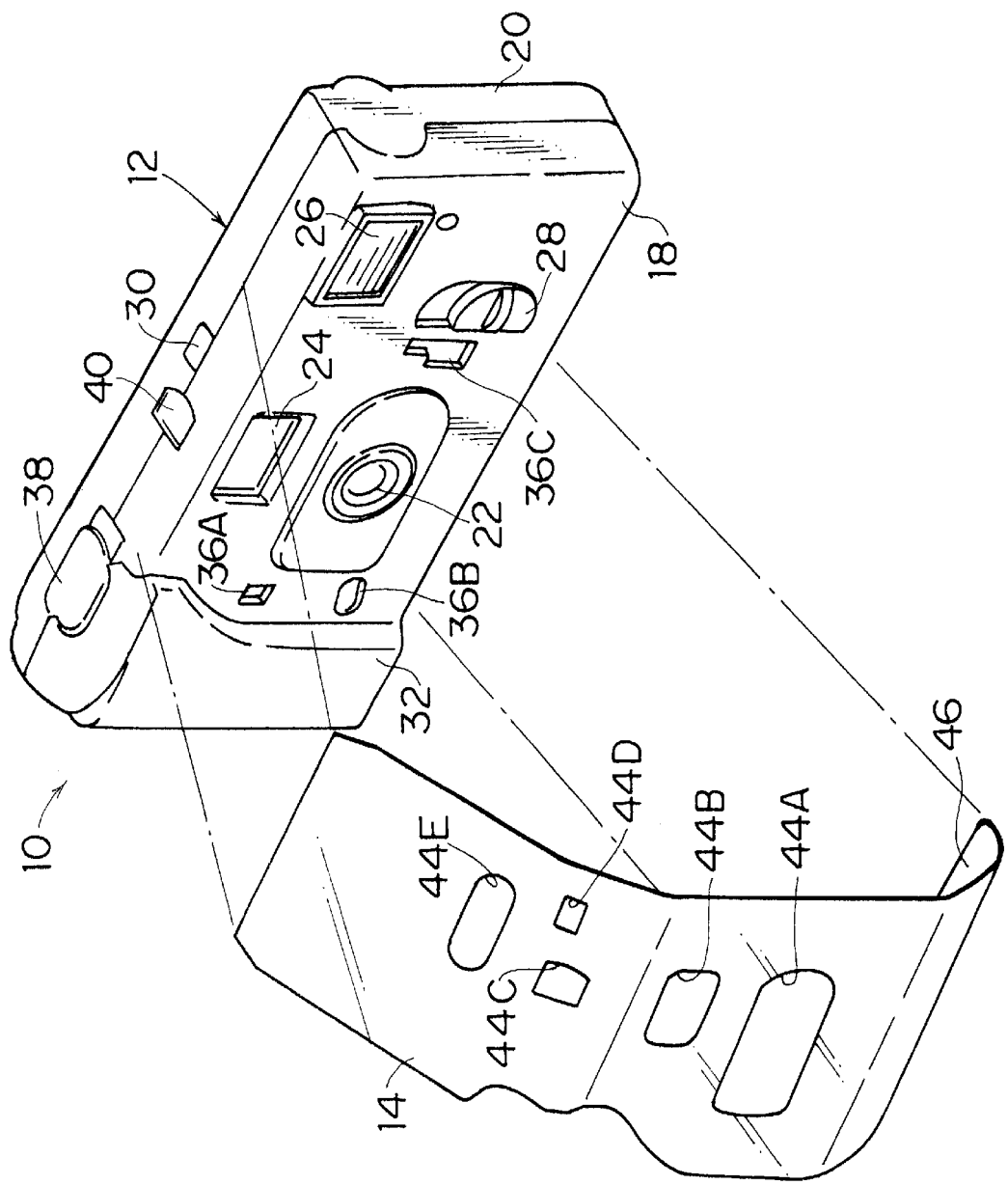
FIG. 1 is a perspective view showing the structure of a single-use camera according to an embodiment of the present invention.

FIG. 1 is a perspective view showing the structure of a single-use camera 10 according to an embodiment of the present invention. The single-use camera 10 comprises a camera body 12 and a wrapping sheet 14 applied on around the central part of the camera body 12. A film cartridge (not illustrated) is built in the camera body 12, and a shutter mechanism, a film winding mechanism etc. are installed in the camera body 12. The front and the back of the camera body 12 are enclosed by a hooked front cover 18 and a hooked back cover 20, respectively. The front cover 18 is made of a transparent resin (e.g., a light-transmissible resin colored pale green), and the back cover 20 is made of an opaque resin colored black, gray, or the like. The back cover 20 may be transparent as is the case with the front cover 18.

A taking lens 22 is provided at substantially the center of the front of the camera body 12, and a finder objective window 24 and a light emitting part of an electronic flash 26 are provided above the taking lens 22. In FIG. 1, reference numeral 28 is an electronic flash switch, and pushing the electronic flash switch 28 down to an OFF position causes the electronic flash 26 to be inactive. Sliding the electronic flash switch 28 up to an ON position starts charging a capacitor for the electronic flash 26.

A pilot lamp 30 is provided at the top of the camera body 12, and the pilot lamp 30 projects from and withdraws into the camera body 12 in connection with the operation of the electronic flash switch 28. The pilot lamp 30 projects from the camera body 12 when the electronic flash switch 28 is pushed from the OFF position to the ON position. During the charging of the capacitor for the electronic flash 26, the pilot lamp 30 blinks. When the charging is completed to enable the electronic flash 26 to emit a light, the pilot lamp 30 goes on to inform a user that a picture can be taken. When the electronic flash switch 28 is pushed down to the OFF position, the pilot lamp 30 withdraws into the camera body 12 to stop charging the capacitor for the electronic flash 26.

A film cartridge chamber is formed in the left section of the camera body 12 in FIG. 1, and a film cartridge (not illustrated) is housed in the film cartridge chamber. A protruding part 32 is formed in the camera body 12 according to an external form of the film cartridge. The protruding part 32 is used as a grip for holding the camera 10. In the camera 10 according to the present invention, the film cartridge is used for the 24 mm advanced photo system (APS), but a 35 mm spooled film may be used.

Openings 36A, 36B, 36C . . . are formed in the front of the front cover 18 in order to avoid the interference with working parts such as a shutter mechanism and for the convenience of the assembly. The forms, positions and number of these openings are determined according to the design of the camera body 12. The openings 36A, 36B, 36C . . . are covered with and sealed by the wrapping sheet 14.

A shutter release button 38 and a frame counter window 40 are also provided at the top of the camera body 12.

The wrapping sheet 14 is a member (a label) for covering the whole circumference of the central part of the camera body 12 over a predetermined width. For example, the wrapping sheet 14 is made of sheet material such as polypropylene (PP), polyethylene terephthalate (PET), polyvinyl chloride (PVC) and polystyrene (PS). The thickness of the sheet 14 is determined within the range between 20 $\mu$m and 300 μm. The sheet 14 may also be made of multiple layers formed by putting two or more kinds of materials together.

The wrapping sheet 14 is formed by cutting a selected sheet material, and openings 44A, 44B, 44C . . . are formed in the wrapping sheet 14 correspondingly to the taking lens 22, the finder objective window 24, the frame counter window 40, etc. of the camera body 12. The taking lens 22, etc. are exposed from the openings 44A, 44B, 44C . . . .

The back of the wrapping surface 14 is thinly coated with an adhesive agent 46 to form an adhesive agent layer. As described later in detail, a transparent print (so-called adhesion reduction) is applied to a predetermined area of the adhesive agent layer for reducing the adhesion of the adhesive agent 46. The transparent print is preferably colorless.

Figure 2:
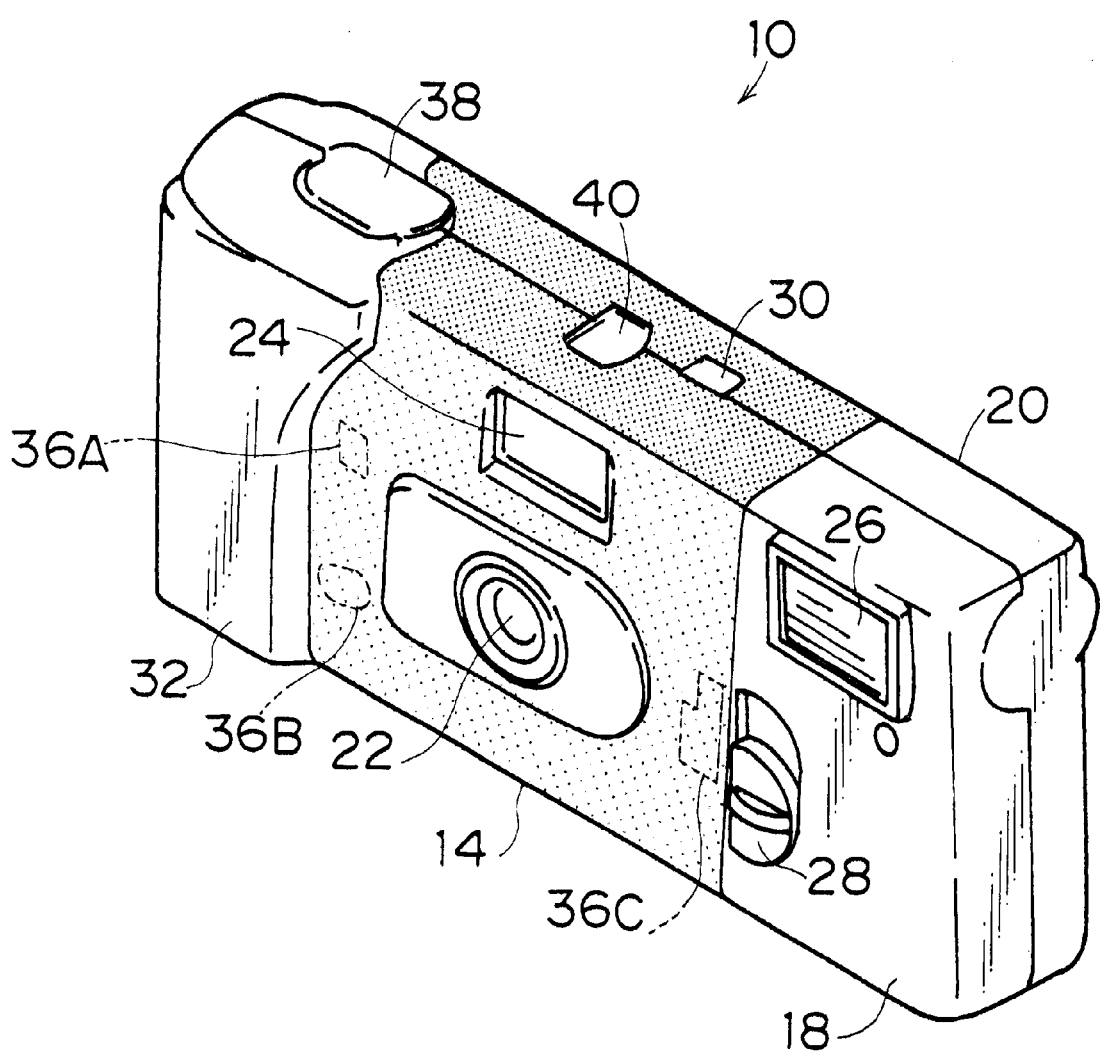
FIG. 2 is a perspective view showing the outside appearance of the single-use camera according to the embodiment of the present invention.

As shown in FIG. 2, the wrapping sheet 14 is once wound around the central part of the camera body 12 in a longitudinal direction. The wrapping sheet 14 is adhered and fixed to the camera body 12 by an adhesion of the adhesive agent 46 in such a manner that both ends of the wrapping sheet 14 are overlapped or joined with each other. The wrapping sheet 14 should not necessarily be wound along the whole circumference of the camera body 12 (once or more), and the wrapping sheet 14 should not always make a round of the camera body 12. Two or more wrapping sheets may be applied on one camera body 12. In this case, the sheets may be overlapped, jointed or separated. For example, a front label entirely or partially covering the front of the camera body 12 and a back label entirely or partially covering the back of the camera body 12 are formed independently of one another, and at least one label of the front label and the back label is applied to the camera body 12.

FIG. 3 is a back view of the camera body 12 to which the wrapping sheet is not applied. FIG. 4 is a sections view showing the principal part of FIG. 3, taken along line 4—4 in FIG. 3. In FIG. 3, reference numeral 48 denotes a finder eyepiece, and 50 denotes a film winding dial. An uneven part 52 is formed on the back cover 20 of the camera body 12 as shown in FIG. 4. The uneven part 52 is formed at a position correspondingly to a pressure plate for ensuring the flatness of the film. The wrapping sheet 14 is applied to the camera body 12 in such a manner as to cover the uneven part 52.

Figure 5:
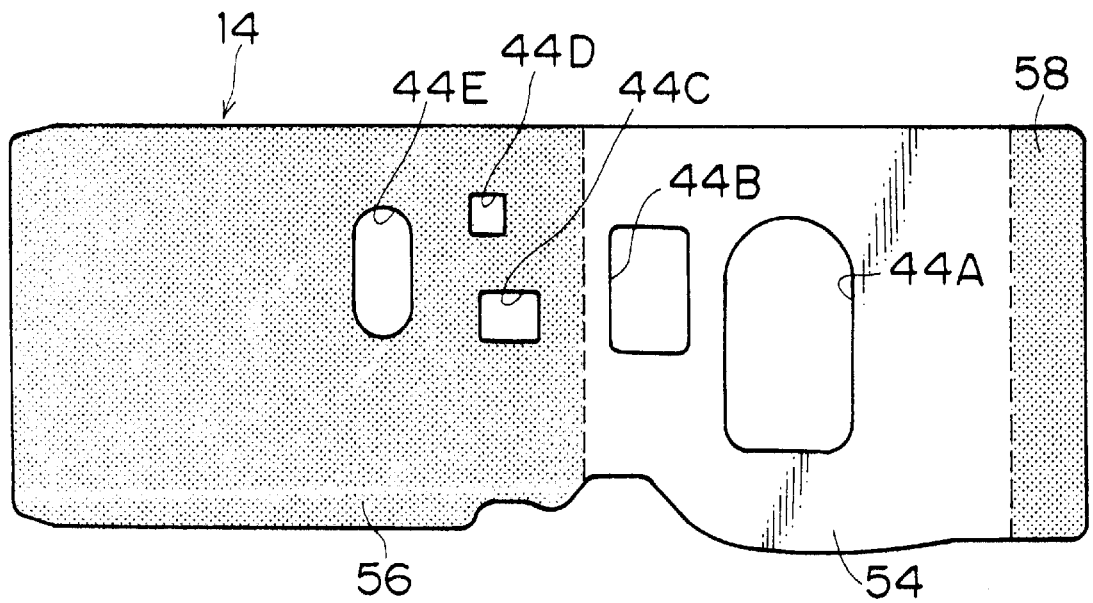
FIG. 5 is a plan view showing a wrapping sheet of the single-use camera in FIG. 1.

FIG. 5 is a plan view showing the structure of the wrapping sheet 14. The opening 44A is formed correspondingly to the taking lens 22, and the opening 44B is formed correspondingly to the finder objective window 24, and the opening 44C is formed correspondingly to the frame counter window 40. An opening 44D is formed correspondingly to a pilot lamp 30, and an opening 44E is formed correspondingly to the finder eyepiece 48.

In the wrapping sheet 14, an area (reference numeral 54) for covering the front of the camera body 12 is transparent, whereas an area (reference numeral 56) for covering the back of the camera body 12 and an area (reference numeral 58) where both ends are overlapped with each other are opaque by print with colored ink. The transparent area 54 of the wrapping sheet 14 is colored, for example, green to harmonize with the color of the front cover 18. A brand name and instructions may be partially printed on the transparent area 54. Directions and the like of the camera 10 are printed on the opaque areas 56, 58 of the wrapping sheet 14.

Figure 6:
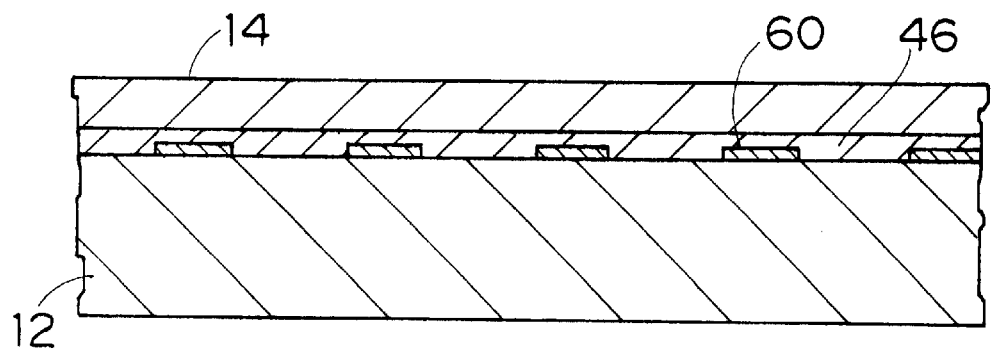
FIG. 6 is a sectional view of a principal part of the single-use camera in FIG. 1.

FIG. 6 is an enlarged sectional view showing the state wherein the wrapping sheet 14 is applied to the camera body 12. As shown in FIG. 6, the whole back surface of the wrapping sheet 14 is uniformly coated with, for example, the acrylic adhesive agent 46 with a strong adhesion at a rate of 20 g/m² to thereby form the adhesive agent layer. The transparent print (so-called adhesion reduction) of dots is applied partially to the adhesive surface at a predetermined printing rate of 20–100%. The transparent print causes a transparent ink 60 to adhere to the adhesive surface, thus forming an ink layer covering the adhesive agent layer. This transparent ink layer decreases an adhesion area according to the printing rate (hereinafter referred to as an adhesion reduction rate), and lowers the adhesion of the adhesive agent 46 of the back of the labels.

Figure 7A:
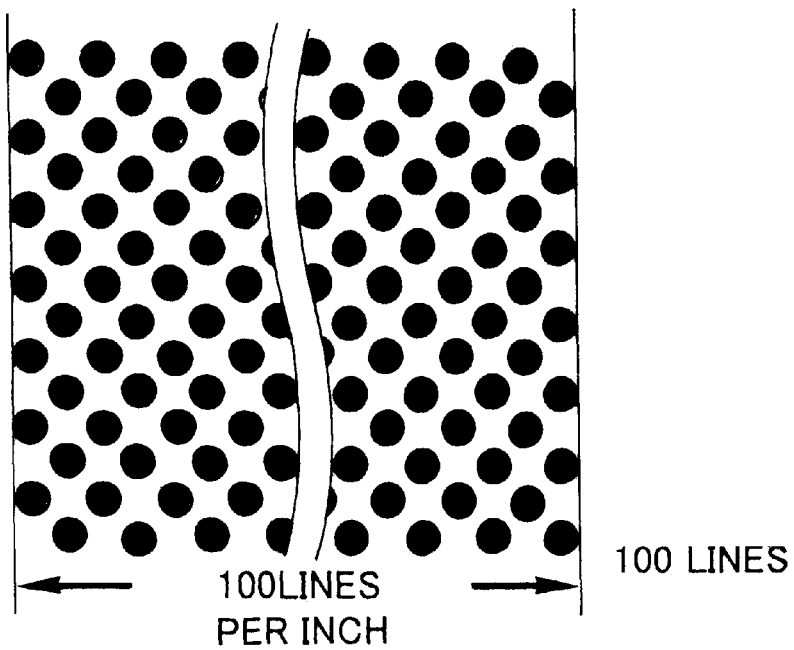
FIGS. 7(A) and 7(B) are explanation drawings showing the concept of the number of lines in dot printing.
Figure 7B:
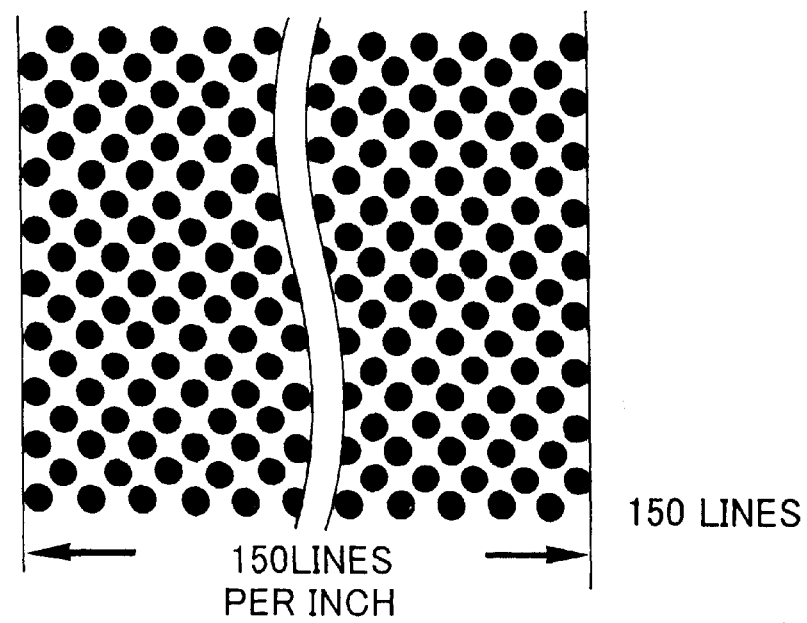

In the dot printing, the density of the dots is expressed in "number of lines". The number of lines means how many lines of dots are arranged per inch. The density of the dots is expressed as "100 lines" if there are 100 lines of dots per inch as shown in FIG. 7(a), and the density of the dots is expressed as "150 lines" if there are 150 lines of dots per inch as shown in FIG. 7(b).

FIG. 8(a) is a view showing dots in the case where the adhesion reduction rate is 20% and the density of the dots is 150 lines. FIG. 8(b) is a view showing dots in the case where the adhesion reduction rate is 60% and the density of the dots is 150 lines. As shown in FIGS. 8(a) and 8(b), the central positions of the dots are determined by the number of lines, and the increase and decrease in the printing rate expands and reduces the size (diameter) of each dot. If the adhesion reduction rate is 20%, the area of the dots (the area which is covered with the transparent ink 60) is small and the adhesion is reduced by 20% per unit area. If the adhesion reduction rate is 60%, the area of the dots (the area which is covered with the transparent ink 60) is large and the adhesion is reduced by 60% per unit area.

A description will now be given of the case where the wrapping sheet (the label) 14 is made of oriented polypropylene (OPP) with thickness of 60 μm and the acrylic adhesive agent 46 with a strong adhesion is used.

Figure 9:
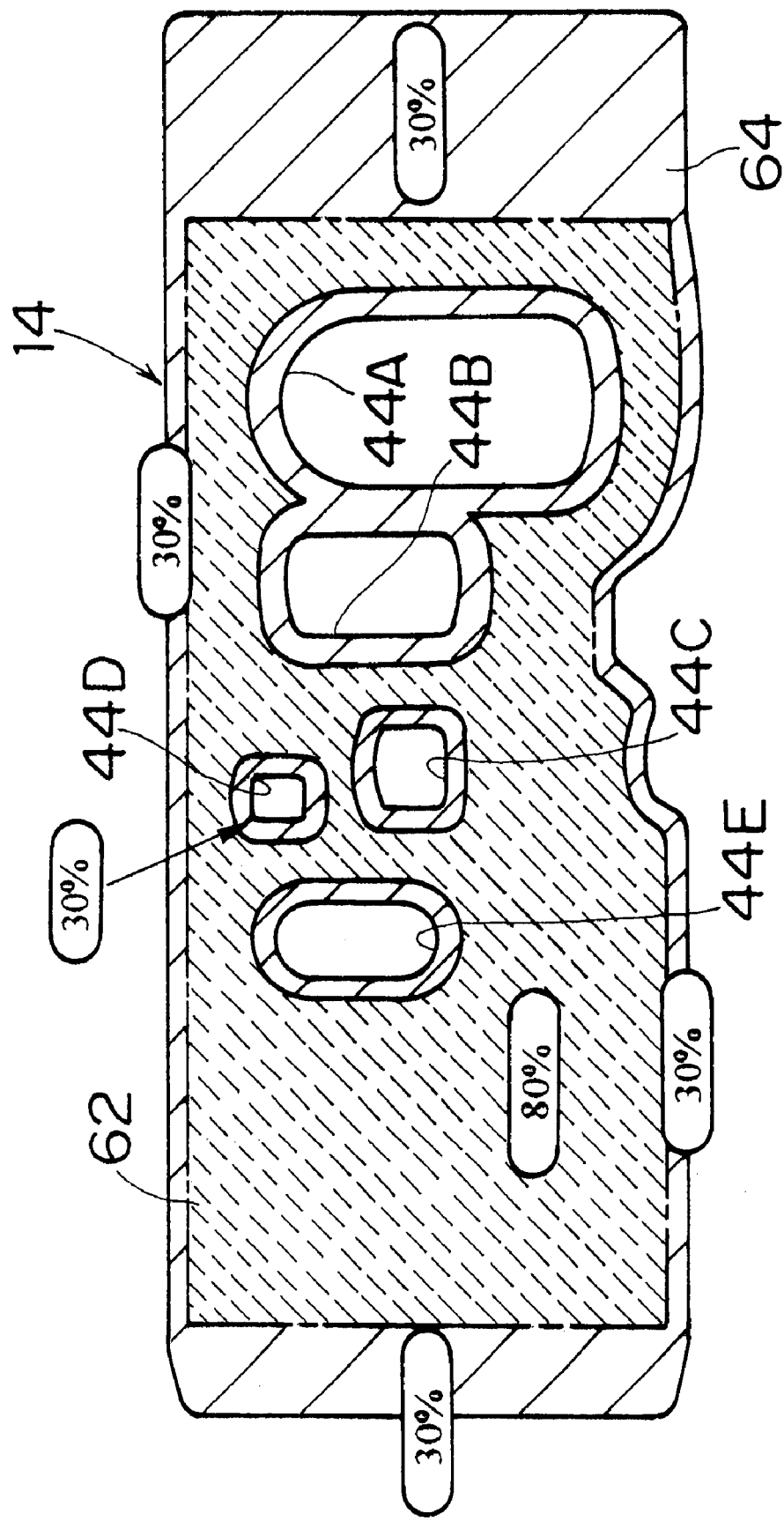
FIG. 9 is a view showing a distribution example of adhesion reduction rates on an adhesive surface of the wrapping sheet according to the embodiment of the present invention.

FIG. 9 is a view showing an example of the distribution of the adhesion reduction rates at the back of the wrapping sheet 14. As shown in FIG. 9, an ink layer of the transparent ink 60 is formed at the adhesion reduction rate of 80% in a broken diagonal line area denoted by reference numeral 62, in other words, an area covering the principal part of the camera body 12 including the uneven part 52 at the front and the back of the camera body 12. The number of lines of dots in the area 62 is, for example, 60. An ink layer of the transparent ink 60 is formed at the adhesion reduction-rate of 30% in label edge areas denoted by reference numeral 64 (predetermined areas from an outer contour line and edge lines of the opening 44A and the like inside the label; "end areas" or "edge areas" in the following description) to increase the adhesion in order to prevent the label 14 from coming off.

The adhesion reduction rate is changed according to the characteristics of the adhesive agent to be used. If the adhesive agent has a strong adhesion, the adhesion reduction rate is between 20% and 100%, and if the adhesive agent is removable, the adhesion reduction rate is determined within the range between 0% and 100%. If the adhesive agent has a strong adhesion, the adhesion reduction rate of the area covering the principal part of the camera body 12 including the uneven part 52 is, for example, between 70% and 90%, and more preferably between 75% and 85%. The adhesion reduction rate of the label edge areas is between 20% and 40%, and more preferably between 25% and 35%.

The adhesion of the removable adhesive agent is lower than that of the adhesive agent having the strong adhesion. For this reason, the adhesion reduction rate of the removable adhesive agent is lower than that of the adhesive agent having the strong adhesion.

Figure 10:
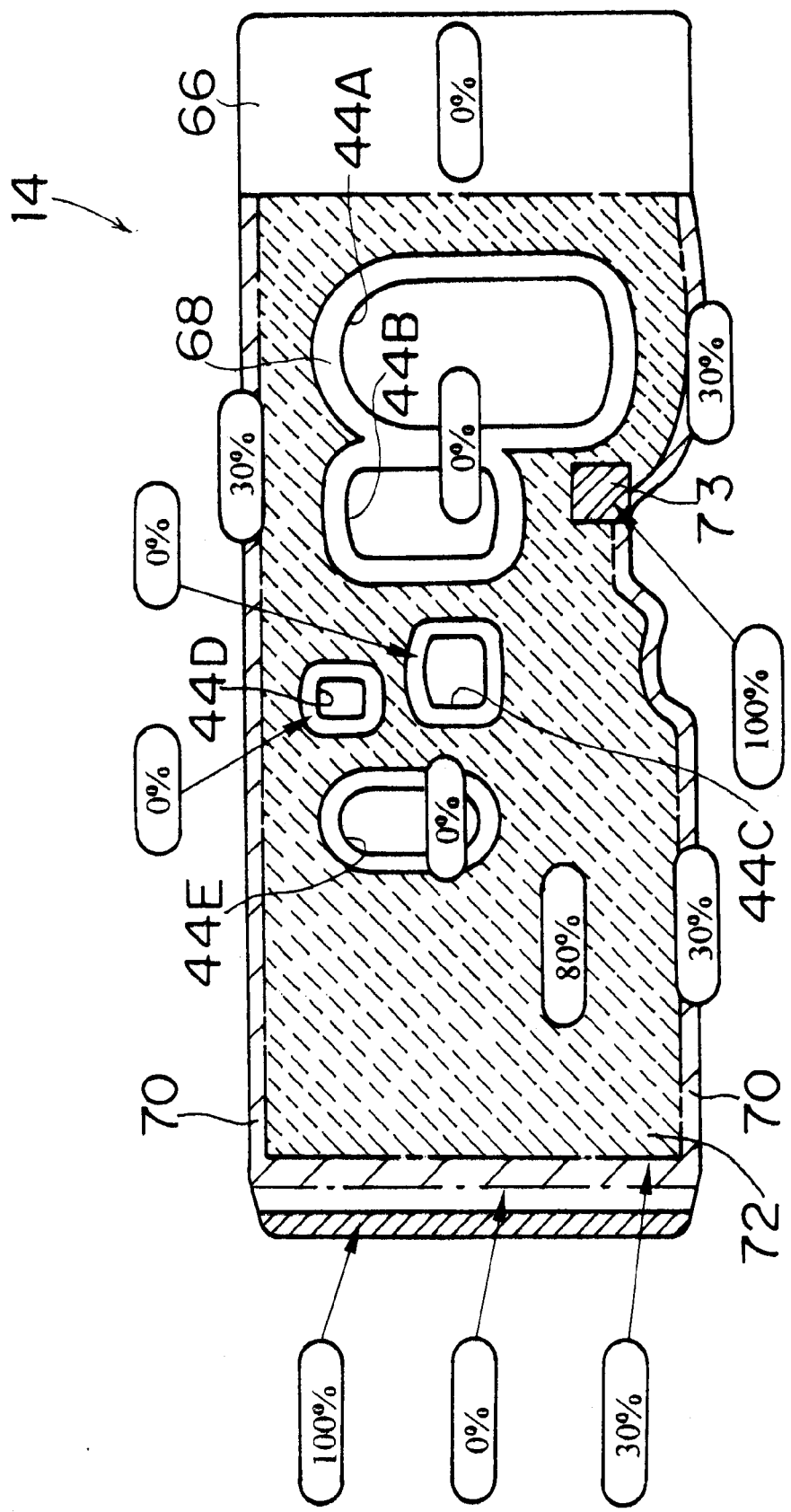
FIG. 10 is a view showing another distribution example of adhesion reduction rates on the adhesive surface of the wrapping sheet according to the embodiment of the present invention.

FIG. 10 is a view showing another distribution example of the adhesion reduction rates at the back of the wrapping sheet 14. The wrapping sheet 14 is wound around the camera body 12, and both ends of the wrapping sheet 14 in FIG. 10 are overlapped and jointed with each other. The adhesion reduction rate for the jointed part (a white area denoted by reference numeral 66) is 0% (i.e., the dot printing using the transparent ink 60 is not applied). The adhesion reduction rate for predetermined areas near the edge lines of the openings 44A–44E (a white area denoted by reference numeral 68) is 0% to prevent the label from coming off. The adhesion reduction rate for the upper and lower edges (a diagonal line area denoted by reference numeral 70) in FIG. 10 is 30% as is the case with the example described with reference to FIG. 9, and the adhesion reduction rate for an area (a broken diagonal line area denoted by reference numeral 72) covering the principal part of the camera body 12 including the uneven part 52 is 80%. The adhesion reduction rate for a diagonal line area denoted by reference numeral 73 is 100% (i.e., no adhesion). The area 73 corresponds to the working part of the shutter mechanism in the camera body 12, and the adhesion of the area 73 is eliminated in order to prevent the operation of the shutter mechanism from being obstructed. As shown in FIG. 10, the adhesion reduction rate may be set to 0%, 30%, 80% or 100% for each area of one wrapping sheet 14.

A description will now be given of the operation of the wrapping sheet 14 that is constructed in the above-mentioned manner.

Figure 11:
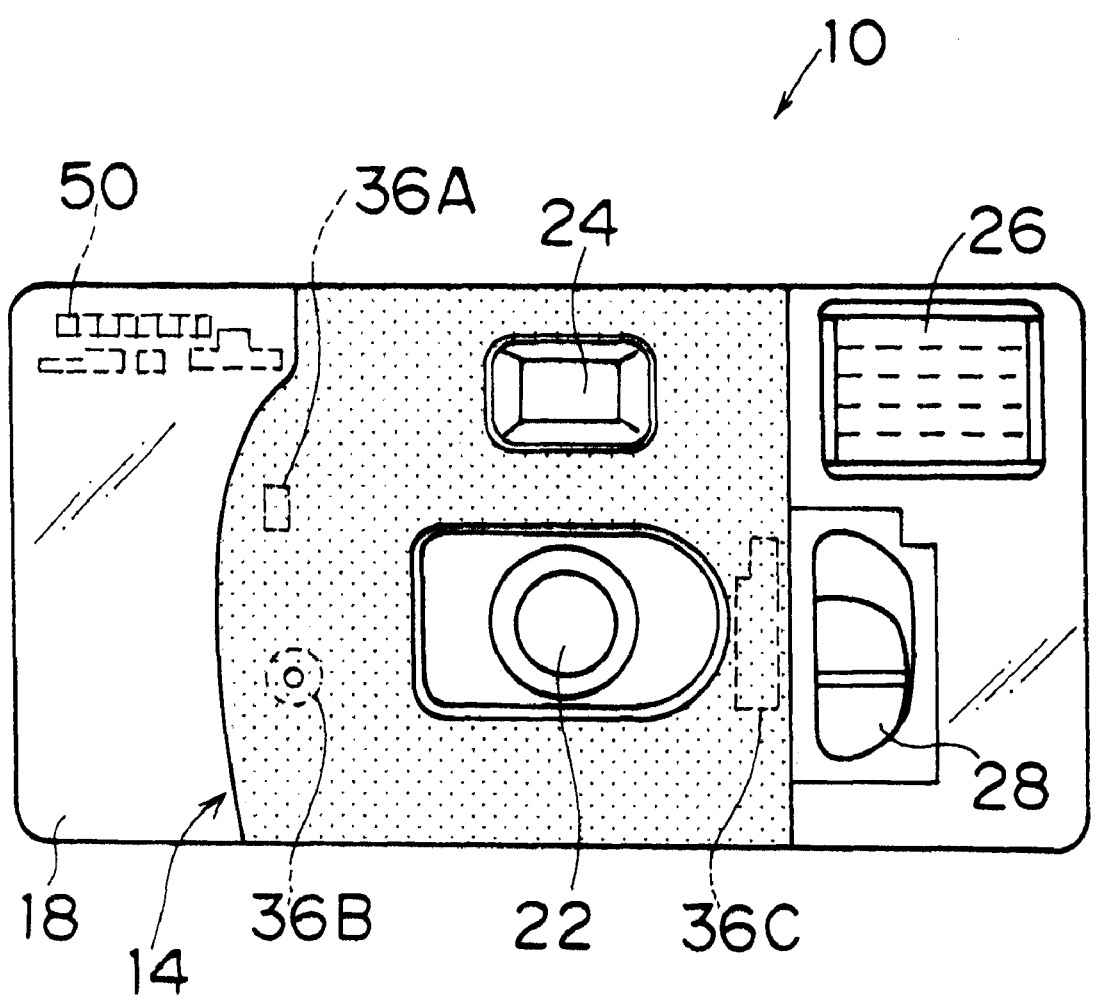
FIG. 11 is a front view showing the single-use camera according to the embodiment of the present invention.
Figure 12:
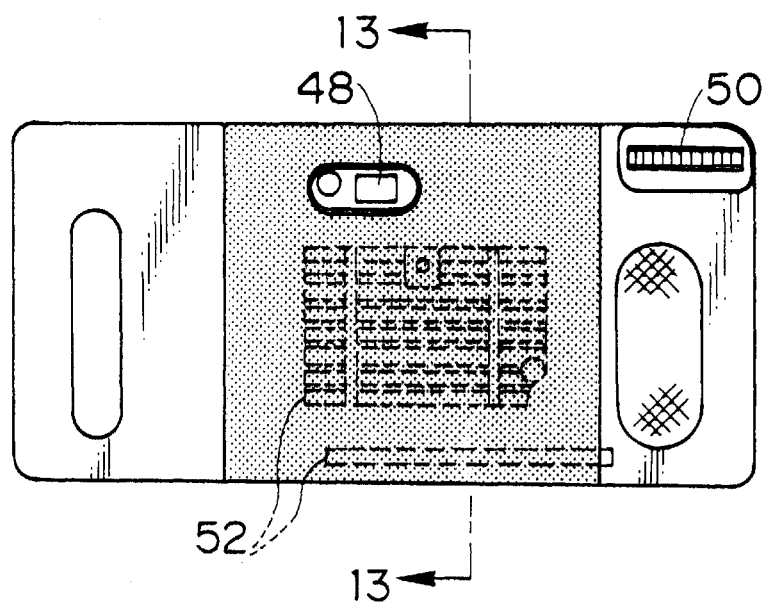
FIG. 12 is a back view showing the single-use camera according to the embodiment of the present invention.
Figure 13:
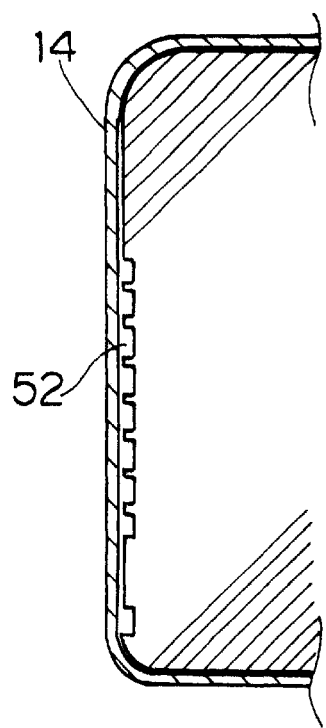
FIG. 13 is a sectional view of a principal part taken along a line 13—13 in FIG. 12.

As described with reference to FIG. 2, the wrapping sheet 14 is wound on the camera body 12 and is fixed by the adhesion of the adhesive agent 46. FIG. 11 is a front view and FIG. 12 is a back view of the camera 10 in the state wherein the wrapping sheet 14 described with reference to FIG. 9 is attached to the camera body 12, and FIG. 13 is a sectional view taken along a line 13—13 in FIG. 12. As shown in FIGS. 11–13, the adhesion of the adhesive surface covering the openings 36A, 36B, 36C at the front of the camera body 12 and the uneven part 52 at the back of the camera body 12 is reduced in the above-described manner, and the openings 36A, 36B, 36C and the uneven part 52 can be seen less through the wrapping sheet 14. Since the front cover 18 is transparent, the inner structure of the camera body 12 (e.g., a working part of the film winding dial 50) can be observed from the outside.

Figure 15:
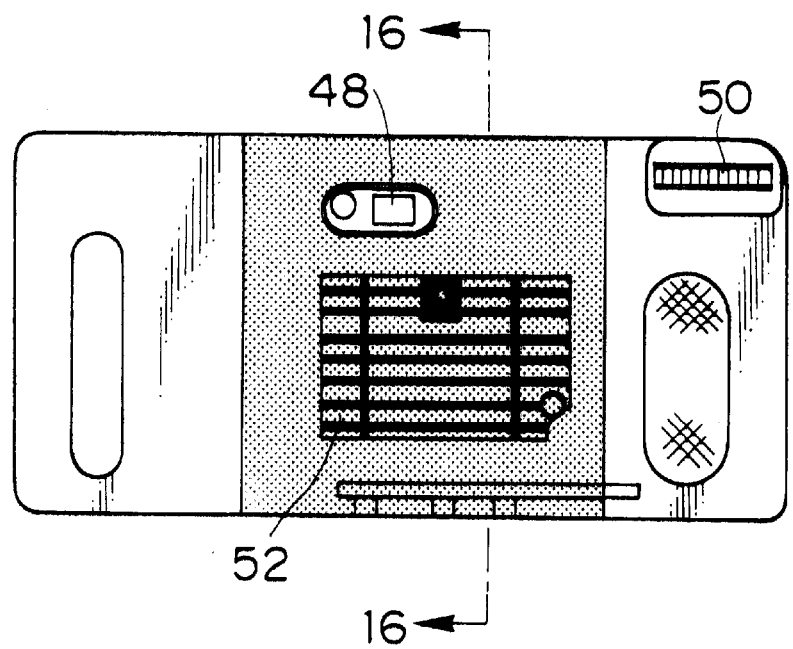
FIG. 15 is a back view showing the comparative example of the single-use camera in the case where an adhesion reduction process is not applied to the adhesive surface of the wrapping sheet.
Figure 16:
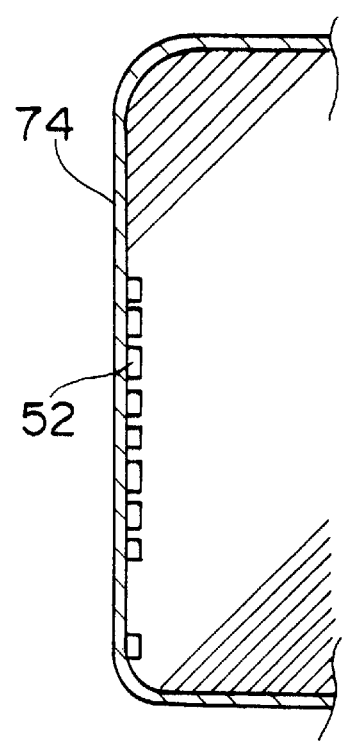
FIG. 16 is a sectional view showing a principal part taken along a line 16—16 in FIG. 15.

For comparison, FIGS. 14–16 show a comparative example wherein the adhesion of the entire adhesive surface of a wrapping sheet 74 applied on the camera body 12 is not reduced. As shown in FIGS. 14–16, if the wrapping sheet 74 is applied on the camera body, 12 without reducing the adhesion of the entire surface thereof, the wrapping sheet 74 is tightly adhered to the outer surface of the camera body as shown in FIG. 16. Therefore, the opening areas 36A, 36B, 36C, ... at the front of the camera body 12 and the uneven part 52 at the back of the camera body 12 can be seen through the thin wrapping sheet 74 (see FIGS. 14 and 15). This deteriorates the outside appearance of the camera, and more particularly, makes it hard to read the directions printed on the part of the wrapping sheet 74 located at the back of the camera.

In the case of the camera 10 according to the present invention, the adhesion is partially reduced, and therefore, the wrapping sheet 14 is slightly separated from the outside surface of the camera body 12 as shown in FIG. 13. A tension applied to the wrapping sheet 14 during the attachment thereof maintains the flatness of the sheet material. Thus, the opening areas 36A, 36B, 36C, ... and the uneven part 52 can be seen less through the wrapping sheet 14.

Consequently, the transparent part at the front of the camera 10 is smoky as a whole and has good appearances, and it is easy to read the directions and the like at the back of the camera 10. In particular, because the color and pattern of the front cover 18 can be seen through the wrapping sheet 14, it is possible to design the camera 10 in a variety of ways.

If the adhesion in the proximity of the edge of the wrapping sheet 14 is partially unreduced as described with reference to FIG. 10, the camera body 12 can be seen through the wrapping sheet 14 only in the proximity of the edge. Minimizing the area achieves the good appearance of the camera 10 since the other areas of the camera body 12 can be seen less through the wrapping sheet 14.

In the above description, the front cover 18 is transparent and colored, but the front cover 18 may also be transparent and colorless, semitransparent, translucent or opaque. The front cover 18 may be colored and patterned. The transparent and colored wrapping sheet can shield more light than the transparent and colorless one.

In the camera 10 described with reference to FIG. 1, the pilot lamp 30 is projected from the top of the camera body 12. Alternatively, if at least one of the front cover 18 and the back cover 20 is transparent and a transparent label is attached to the transparent front and/or back cover, the pilot lamp 30 can be arranged inside the camera body 12. With this arrangement, the lighting of the pilot lamp 30 can be seen from the outside. In this case, there is no necessity of providing a light guide and the like for guiding the light of the pilot lamp 30 in the camera body 12. Moreover, there is no necessity of providing a peep hole for the pilot lamp 30, and this simplifies the structure of the camera 10.

If the front cover 18 is transparent, the inside mechanism of movable parts of the electronic flash switch 28 can be seen from the outside, and this prevents the user from forgetting to turn off the electronic flash switch 28.

The adhesion property of the adhesive agent 46 is determined according to a kind of material used for the wrapping sheet 14. Generally, if the material of the wrapping sheet 14 is soft, the adhesion reduction rate is set relatively large so that the adhesion is lowered.

In this embodiment, the dot printing using the transparent ink is applied to reduce the adhesion of the adhesive surface. Alternatively, the adhesive surface may be embossed to reduce the adhesion.

In this embodiment, the wrapping sheet 14 has the transparent part 54 and the opaque part 56. However, the whole wrapping sheet 14 may be transparent.

The use of the transparent label instead of the conventional opaque label makes the boundary between the transparent label and the camera body 12 inconspicuous. This makes the rise of the label from the edges of the exposure openings (44A–44E) of the finder, the taking lens and the like inconspicuous. Therefore, the wrinkles of the label are inconspicuous, and this achieves a good appearance of the camera 10. The "all-over uniform printing" for concealment is not applied to the transparent part of the wrapping sheet 14 according to this embodiment, and this prevents the quality of regenerated resin from deteriorating in the recycling step compared with the case where the "all-over uniform printing" is applied.

Moreover, the front cover 18 of the camera body 12 is made of transparent and colored resin, and the colored and transparent label 14 resembling the camera body 12 in color is attached to the surface of the camera body 12. This improves the design, and achieves a bright image of the camera 10. Consequently, it is possible to provide a number of color variations for the camera 10, and it is also possible to select color of the camera according to the purposes of photography among a number of variations. For example, a green camera is used for taking pictures of natural scenery such as mountains, and an orange camera is used for taking pictures of human beings. The user can carry the camera 10 of a novel design as a sort of fashion, and select the color of the camera 10 according the photographing situations.

Even if the user takes pictures with a camera 10 among a number of color variations during a trip or the like and forgets to develop the film for a certain period of time, he or she can immediately remember what kinds of pictures were taken with the camera 10 with reference to the color of the camera body 12.

In this embodiment, the present invention is applied to the single-use camera 10, but the present invention may also be applied to a various kinds of cameras such as a normal compact camera (a silver halide camera), an electronic still camera and a video camera.

Examples

FIG. 17 is a chart showing the concrete examples of the sheet materials (label base materials), the adhesive agents, the distributions of the adhesion reduction rates, and the transparent ink). "End face" in the row of "dot printing" means an area in proximity to the edge of the wrapping sheet, and "all-over surface" means an area except for the end face.

The Example 1 is equivalent to the embodiment described with reference to FIG. 9. The wrapping sheet in the Example 1 is constructed in such a manner that an acrylic adhesive agent with a strong adhesion is coated at a coating rate of 20 g/m² on a label base material of OPP with the thickness of 60 μm. The dot printing is applied to the adhesive surface of the wrapping sheet on condition that the adhesion reduction rate is 30% for the end face and 80% for the all-over surface. The density of the dots is 60 lines. The transparent ink for this dot printing is UV Best Cure 161 (a brand name) produced by Toka.

The wrapping sheet in the Example 2 is constructed in such a manner that an acrylic adhesive agent with a strong adhesion is coated at a coating rate of 20 g/m² on a label base material of PET with the thickness of 25 μm. The dot printing is applied to the adhesive surface of the wrapping sheet on condition that the adhesion reduction rate is 20% for the end face and 60% for the all-over surface. The density of the dots is 150 lines. The transparent ink for this dot printing is UV Best Cure 161 (a brand name) produced by Toka.

The wrapping sheet in the Example 3 is constructed in such a manner that an acrylic removable adhesive agent is coated at a coating rate of 20 g/m² on a label base material of PVC with the thickness of 50 μm. The dot printing is applied to the adhesive surface of the wrapping sheet on condition that the adhesion reduction rate is 10% for the end face and 90% for the all-over surface. The density of the dots is 85 lines. The transparent ink for this dot printing is UV Best Cure 161 (a brand name) produced by Toka.

The wrapping sheet in the Example 4 is constructed in such a manner that an acrylic removal adhesive agent is coated at a coating rate of 20 g/m² on a label base material of PS with the thickness of 40 μm. The dot printing is applied to the adhesive surface of the wrapping sheet on condition that the adhesion reduction rate is 0% for the end face and 70% for the all-over surface. The density of the dots is 100 lines. The transparent ink for this dot printing is UV Best Cure 161 (a brand name) produced by Toka.

As stated above, it is possible to combine the base material, the adhesive agent and the adhesion reduction rates in a variety of ways, and the optimum combination is selected by taking the required performance, cost, and the like into consideration.

According to the present invention, the transparent wrapping sheet is attached to the surface of the camera body, and this makes the boundary between the camera body and the label inconspicuous to achieve the good appearance. In particular, the transparent label is attached to the transparent camera body, and the camera has a bright impression.

According to the present invention, an ink printing such as the "all-over uniform printing" is not applied to the transparent part, and this reduces the amount of impurities generated from the ink in the recycling step and prevents the regenerated resin from deteriorating.

According to the present invention, the adhesion reduction process is applied to the adhesive surface of the area of the wrapping sheet covering the uneven part of the camera body to reduce the adhesion. Therefore, the wrapping sheet is attached with a flat and good appearance regardless of the unevenness on the surface of the camera body. In particular, if the directions are printed on the wrapping sheet, the present invention makes it easier to read the letters.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera wrapping sheet attached to a surface of a camera body, wherein:

the camera wrapping sheet has a transparent area and an opaque area;

an adhesive agent is coated on one side of the camera wrapping sheet to be attached to the surface of the camera body to thereby form an adhesive agent layer; and wherein the adhesive is disposed on the wrapping sheet to provide at least one area of a first level of adhesion and at least one area of relatively reduced adhesion, the at least one area of relatively reduced adhesion being arranged to cover an uneven part of the camera body when the camera wrapping sheet is attached to a camera; and wherein the uneven part of the camera body comprises relatively high and relatively low areas, and wherein the wrapping sheet, adhesive agent, and relatively high and low areas are proportioned so that the adhesive agent does not make contact with the relatively low areas.

2. The camera wrapping sheet as defined in claim 1, wherein the camera wrapping sheet is a transparent and colored label made of a transparent and colored resin.

3. The camera wrapping sheet as defined in claim 1, wherein a transparent ink is disposed on the adhesive surface to provide the at least one area of relatively reduced adhesion.

4. The camera wrapping sheet as defined in claim 3, wherein the adhesive agent has a strong adhesion, and the transparent ink is applied to the adhesive surface at a predetermined printing rate between 20% and 100%.

5. The camera wrapping sheet as defined in claim 4, wherein the transparent ink is applied to an end face area of the adhesive surface at a lower printing rate than the area of the adhesive surface covering the uneven part.

6. The camera wrapping sheet as defined in claim 5, wherein a dot printing rate of the end face area of the camera wrapping sheet is between 0% and 40%.

7. The camera wrapping sheet as defined in claim 3, wherein the adhesive agent layer is a removal adhesive agent, and the transparent ink is applied to the adhesive surface at a predetermined printing rate between 0% and 100%.

8. The camera wrapping sheet as defined in claim 7, wherein the transparent ink is applied to an end face area of the adhesive surface at a lower printing rate than the area of the adhesive surface covering the uneven part.

9. The camera wrapping sheet as defined in claim 8, wherein a dot printing rate of the end face area of the camera wrapping sheet is between 0% and 40%.

10. The camera wrapping sheet as defined in claim 1, wherein an adhesion of a predetermined area of the camera wrapping sheet in a proximity of edges of the camera wrapping sheet is higher than an adhesion of an area of the camera wrapping sheet covering the uneven part.

11. The camera wrapping sheet as defined in claim 10, wherein the camera wrapping sheet has an opening for exposing a part of the camera body, and the edges include an edge of the opening.

12. The camera wrapping sheet as defined in claim 1, wherein the camera wrapping sheet is made of one of the following materials: polypropylene, polyethylene terephthalate, polyvinyl chloride and polystyrene; and the thickness of the camera wrapping sheet is between 20 µm and 300 µm.

13. The camera wrapping sheet as defined in claim 1, wherein the camera wrapping sheet has a layered structure made of a combination of at least two of the following materials: polypropylene, polyethylene terephthalate, polyvinyl chloride and polystyrene; and the thickness of the camera wrapping sheet is between 20 µm and 300 µm.

14. The camera wrapping sheet as defined in claim 1, wherein the adhesion of the adhesive surface is set in at least three levels.

15. The camera wrapping sheet as defined in claim 1, wherein at least one of a trademark indicating a brand name and directions is printed on the transparent area of the camera wrapping sheet.

16. The camera wrapping sheet as defined in claim 1, wherein the camera body is of a single-use camera in which a photo film is previously mounted, the single-use camera having a taking lens and a shutter mechanism.

17. The camera wrapping sheet as defined in claim 1, wherein the camera body has a front cover at least partially made of a transparent resin.

18. The camera wrapping sheet as defined in claim 17, wherein a transparent area of the front cover is colored.

19. The camera wrapping sheet of claim 1, wherein a highest level of adhesion is arranged to surround at least one aperture in the wrapping sheet.

20. The camera wrapping sheet of claim 19, wherein the adhesive side of the wrapping sheet comprises at least one area having no adhesion.

21. The camera wrapping sheet of claim 20, wherein the adhesive side of the wrapping sheet includes a panel along one edge of the wrapping sheet having no adhesion.

22. The camera wrapping sheet of claim 1, wherein the uneven part comprises a parallel arrangement of ridges and troughs disposed on a back surface of the camera body.

23. The camera wrapping sheet as defined in claim 1, wherein said area of relatively reduced adhesion is transparent and is slightly separated from said uneven part of the camera body.

24. A camera wrapping sheet attached to a surface of a camera body, wherein:
   the camera wrapping sheet is transparent;
   an adhesive agent is coated on one side of the camera wrapping sheet to be attached to the surface of the camera body to thereby form an adhesive agent layer; and
   wherein the adhesive is disposed on the wrapping sheet to provide at least one area of a first level of adhesion and at least one area of relatively reduced adhesion, the at least one area of relatively reduced adhesion being arranged to cover an uneven part of the camera body when the camera wrapping sheet is attached to a camera; and
   wherein the uneven part of the camera body comprises relatively high and relatively low areas, and wherein the wrapping sheet, adhesive agent, and relatively high and low areas are proportioned so that the adhesive agent does not make contact with the relatively low areas.

25. The camera wrapping sheet as defined in claim 24, wherein the camera wrapping sheet is a transparent and colored label made of a transparent and colored resin.

26. The camera wrapping sheet as defined in claim 24, wherein a transparent ink is disposed on the adhesive surface to provide the at least one area of relatively reduced adhesion.

27. The camera wrapping sheet as defined in claim 26, wherein the adhesive agent has a strong adhesion, and the transparent ink is applied to the adhesive surface at a predetermined printing rate between 20% and 100%.

28. The camera wrapping sheet as defined in claim 27, wherein the transparent ink is applied to an end face area of the adhesive surface at a lower printing rate than the area of the adhesive surface covering the uneven part.

29. The camera wrapping sheet as defined in claim 28, wherein a dot printing rate of the end face area of the camera wrapping sheet is between 0% and 40%.

30. The camera wrapping sheet as defined in claim 26, wherein the adhesive agent layer is a removal adhesive agent, and the transparent ink is applied to the adhesive surface at a predetermined printing rate between 0% and 100%.

31. The camera wrapping sheet as defined in claim 30, wherein the transparent ink is applied to an end face area of the adhesive surface at a lower printing rate than the area of the adhesive surface covering the uneven part.

32. The camera wrapping sheet as defined in claim 31, wherein a dot printing rate of the end face of the camera wrapping sheet is between 0% and 40%.

33. The camera wrapping sheet as defined in claim 24, wherein an adhesion of a predetermined area of the camera wrapping sheet in a proximity of edges of the camera wrapping sheet is higher than an adhesion of an area of the camera wrapping sheet covering the uneven part.

34. The camera wrapping sheet as defined in claim 33, wherein the camera wrapping sheet has an opening for exposing a part of the camera body, and the edges include an edge of the opening.

35. The camera wrapping sheet as defined in claim 24, wherein the camera wrapping sheet is made of one of the following materials: polypropylene, polyethylene terephthalate, polyvinyl chloride and polystyrene; and the thickness of the camera wrapping sheet is between 20 µm and 300 µm.

36. The camera wrapping sheet as defined in claim 24, wherein the camera wrapping sheet has a layered structure made of a combination of at least two of the following materials: polypropylene, polyethylene terephthalate, polyvinyl chloride and polystyrene; and the thickness of the camera wrapping sheet is between 20 $\mu$m and 300 $\mu$m.

37. The camera wrapping sheet as defined in claim 24, wherein the adhesion of the adhesive surface is set in at least three levels.

38. The camera wrapping sheet as defined in claim 24, wherein at least one of a trademark indicating a brand name and directions is printed on the transparent area of the camera wrapping sheet.

39. The camera wrapping sheet as defined in claim 24, wherein the camera body is of a single-use camera in which a photo film is previously mounted, the single-use camera having a taking lens and a shutter mechanism.

40. The camera wrapping sheet as defined in claim 24, wherein the camera body has a front cover at least partially made of a transparent resin.

41. The camera wrapping sheet as defined in claim 40, wherein a transparent area of the front cover is colored.

42. The camera wrapping sheet of claim 24, wherein a highest level of adhesion is arranged to surround at least one aperture in the wrapping sheet.

43. The camera wrapping sheet of claim 42, wherein the adhesive side of the wrapping sheet comprises at least one area having no adhesion.

44. The camera wrapping sheet of claim 43, wherein the adhesive side of the wrapping sheet includes a panel along one edge of the wrapping sheet having no adhesion.

45. The camera wrapping sheet of claim 24, wherein the uneven part comprises a parallel arrangement of ridges and troughs disposed on a back surface of the camera body.

46. The camera wrapping sheet as defined in claim 24, wherein said area of reduced adhesion is slightly separated from said uneven part of the camera body.

47. A camera in which a wrapping sheet is attached to a surface of a camera body, wherein:

the wrapping sheet has a transparent area and an opaque area;

an adhesive agent layer is formed on one side of the wrapping sheet to be attached to the surface of the camera body;

wherein the adhesive is disposed on the wrapping sheet to provide at least one area of a first level of adhesion and at least one area of relatively reduced adhesion, the at least one area of relatively reduced adhesion being arranged to cover an uneven part of the camera body when the camera wrapping sheet is attached to a camera; and the wrapping sheet is fixed to the camera body by the at least one area of a first level of adhesion and at least one area of relatively reduced adhesion; and wherein the uneven part of the camera body comprises relatively high and relatively low areas, and wherein the wrapping sheet, adhesive agent, and relatively high and low areas are proportioned so that the adhesive agent does not make contact with the relatively low areas.

48. The camera as defined in claim 47, wherein a front cover of the camera body is at least partially made of a transparent resin.

49. The camera as defined in claim 48, wherein a transparent part of the front cover is colored.

50. The camera as defined in claim 47, wherein the camera is a single-use camera in which a photo film is previously mounted, the single-use camera having a taking lens and a shutter mechanism.

51. The camera as defined in claim 50, wherein a front cover of the camera body is at least partially made of a transparent resin.

52. The camera as defined in claim 31, wherein a transparent part of the front cover is colored.

53. The camera of claim 47, wherein a highest level of adhesion is arranged to surround at least one aperture in the wrapping sheet.

54. The camera of claim 53, wherein the adhesive side of the wrapping sheet comprises at least one area having no adhesion.

55. The camera of claim 54, wherein the adhesive side of the wrapping sheet includes a panel along one edge of the wrapping sheet having no adhesion.

56. The camera of claim 47, wherein the uneven part comprises a parallel arrangement of ridges and troughs disposed on a back surface of the camera body.

57. The camera wrapping sheet as defined in claim 47, wherein said area of relatively reduced adhesion is transparent and is slightly separated from said uneven part of the camera body.

58. A camera in which a wrapping sheet is attached to a surface of a camera body, wherein:

the wrapping sheet is transparent;

an adhesive agent layer is formed on one side of the wrapping sheet to be attached to the surface of the camera body;

wherein the adhesive is disposed on the wrapping sheet to provide at least one area of a first level of adhesion and at least one area of relatively reduced adhesion, the at least one area of relatively reduced adhesion being arranged to cover an uneven part of the camera body when the camera wrapping sheet is attached to a camera; and the wrapping sheet is fixed to the camera body by the at least one area of a first level of adhesion and at least one area of relatively reduced adhesion; and wherein the uneven part of the camera body comprises relatively high and relatively low areas, and wherein the wrapping sheet, adhesive agent, and relatively high and low areas are proportioned so that the adhesive agent does not make contact with the relatively low areas.

59. The camera as defined in claim 58, wherein the camera is a single-use camera in which a photo film is previously mounted, the single-use camera having a taking lens and a shutter mechanism.

60. The camera as defined in claim 59, wherein a front cover of the camera body is at least partially made of a transparent resin.

61. The camera as defined in claim 60, wherein a transparent part of the front cover is colored.

62. The camera of claim 58, wherein the uneven part comprises a parallel arrangement of ridges and troughs disposed on a back surface of the camera body.

63. The camera wrapping sheet as defined in claim 58, wherein said area of reduced adhesion is slightly separated from said uneven part of the camera body.

* * * * *